United States Patent [19]

Bergren, III

[11] Patent Number: 5,729,013
[45] Date of Patent: Mar. 17, 1998

[54] WELLBORE INFRARED DETECTION DEVICE AND METHOD

[75] Inventor: Frank E. Bergren, III, Anchorage, Ak.

[73] Assignee: Atlantic Richfield Company, Los Angeles, Calif.

[21] Appl. No.: 740,875

[22] Filed: Nov. 4, 1996

[51] Int. Cl.$^6$ .................... G01V 9/00; G01N 21/17
[52] U.S. Cl. .................. 250/255; 250/256; 250/341.7; 250/339.11
[58] Field of Search ................... 250/256, 258, 250/255, 341.8, 341.7, 268, 339.11, 339.12

[56] References Cited

U.S. PATENT DOCUMENTS

| | | | |
|---|---|---|---|
| 3,781,910 | 12/1973 | Herrmann | 250/341 |
| 4,994,671 | 2/1991 | Safinya et al. | 250/255 |
| 5,166,747 | 11/1992 | Schroeder et al. | 356/326 |
| 5,266,800 | 11/1993 | Mullins | 250/256 |
| 5,331,156 | 7/1994 | Hines et al. | 250/256 |
| 5,530,243 | 6/1996 | Mathis | 250/256 |

OTHER PUBLICATIONS

Literature from Schlumberger re: Digital Entry and Fluid Imaging Tool (DEFT), pp. 1-8 and 12 and Presentation Slides 1-8, May 1996.

Dresser Atlas, Interpretive Methods for Production Well Logs, Third Edition, Dresser Industries, Inc., 1982, no month, Section 2, The Continuous Spinner Flowmeter: A Velocity Measuring Instrument; Section 3, The Basket Flowmeter; Section 7, Wellbore Pressure Gradients in Gas—Liquid Flow; Section 8, The Fluid Density Instrument; and Section 9, The Fluid Capacitance Instrument.

Primary Examiner—Don Wong
Attorney, Agent, or Firm—F. Lindsey Scott

[57] ABSTRACT

A production logging device, insertable into a cased or uncased wellbore for determining concentration of specified components in flowing production fluid, is provided having a tool body sized smaller in diameter than the wellbore so that flowing fluid production is not blocked. A line is connected to the tool body by which movement of the tool body within the wellbore casing can be selectably controlled from a remote location, and by which information signals can be communication from the tool body to the remote location. An infrared radiation source operatively connected to the tool body. A plurality of infrared transmission sites are circumferentially spaced around the tool body directed so that infrared radiation from the infrared radiation source is transmitted through flowing production fluid in the wellbore. A plurality of infrared receptors are circumferentially spaced around the tool body and are positioned so that infrared radiation transmitted through flowing production fluid is received at the plurality of receptors. An infrared analyzer is carried by the tool body, operatively connected to infrared receptors, so that the spectrum of infrared radiation transmitted through production fluid can be determined.

21 Claims, 4 Drawing Sheets

WELLBORE INFRARED DETECTION DEVICE AND METHOD

TECHNICAL FIELD OF THE INVENTION

This invention relates to an infrared detection device for determining sources and concentrations of oil and water flow in cased and uncased wellbores; and more particularly to an infrared detection device insertable into a wellbore without interrupting the flowing fluid production; and more particularly to an infrared detection device which is insertable into an inclined or horizontal wellbore casing, to provide a plurality of radially-spaced detection zones across the wellbore cross section, so that two-phase and three-phase fluid flow patterns may be detected and logged along the length of the wellbore casing.

BACKGROUND OF THE INVENTION

Water production from hydrocarbon fluid production wells has been a longstanding problem. Mature oil fields which are being waterflooded to stimulate oil production may experience water flows from production wells which exceed ninety percent (90%) of total fluid production from such wells. Water production can be controlled, particularly in wells producing from multiple zones if, for example, it can be determined that one or more zones is producing a very high volume of water or substantially all the water flowing into the well. In certain instances, water production from a particular zone may be controlled by plugging perforations or fractures about the wellbore radius if water production from particular areas within a zone can be detected. Particularly useful in wellbores with casing pipe which is perforated in a production zone is a process known as cement squeeze by which perforations in a given section are sealed.

Detection of a source or sources of water downhole is considered difficult with existing technology. It is particularly difficult to determine the sources of water in inclined wellbores or in horizontal wellbores. Downhole fluid samplers are available which capture a sample of the wellbore fluid for analysis. However, these tools are generally unreliable with respect to detecting whether a particularly prolific source of water is from a particular production zone or even a portion of a production zone. In inclined and horizontal wellbores, water will tend to flow along the low side of the wellbore providing somewhat stratified flow thereby further complicating the detection of whether or not a particular zone or zones is producing all or mostly water into the wellbore as opposed to producing an acceptable mixture of water and oil or, preferably, just oil.

One company has a commercial infrared optical fluid analysis device which utilizes some of the basic elements of infrared transmission and detection in downhole tools wherein a sample of wellbore fluid is captured and directed to a testing region within the tool. Infrared radiation having a known spectrum is directed toward the fluid and the spectrum of transmitted or scattered infrared radiation is compared to a computer database of absorption spectrum information for fluids of the type to be detected. This prior downhole tool analyzes a sample from a given depth or a given position in the wellbore. Production fluid is diverted from its normal flow pattern to obtain a testing sample. Only an approximation of the fluid condition is obtained based upon such sampling. Such an approximation can vary greatly, particularly in an inclined or horizontal wellbore, depending upon the position in the wellbore from which the sample was taken.

SUMMARY OF THE INVENTION

An infrared source and detector disposed downhole is provided which is capable of determining whether the fluid flowing past the detector is water or oil. It has been found that the optical densities of water and crude oil with respect to the transmission of infrared radiation are particularly distinct. Water, including brine, exhibits an optical density peak at a wavelength of approximately 1.45 micrometers and crude oil exhibits an optical density peak at wavelengths of approximately 1.75 and 2.275 micrometers. By a particular arrangement of a downhole logging device having a tool body carrying an infrared radiation source and a detector onboard, longitudinally spaced sections of a perforated wellbore casing can be identified which are producing excessive mounts of water. Particular areas, zones or radial locations about the wellbore radius within a given longitudinal section which are the source of excess water production can also be identified. Based upon a plurality of discrete infrared detection zones around the tool body, the flow pattern or flow regime of production fluid flow can be determined without interrupting production to take samples.

Advantages of the device described and shown in the diagrams are that the device may be traversed through the well without interrupting fluid production during the analysis procedure. The device is capable of analyzing all fluid flow on an average or selective basis at any longitudinal location along the wellbore and the device may be continuously traversed through the wellbore to minimize analysis time and to accurately locate sources of excessive water into the well and/or desirable quantities of oil production into a well.

BRIEF DESCRIPTION OF THE DRAWINGS

The foregoing objects, advantages, and features, as well as other objects and advantages, will become more apparent with reference to the description and drawings below, in which like numerals represent like elements and in which.

DETAILED DESCRIPTION OF THE PREFERRED EMBODIMENTS

The attached drawing figures illustrate many of the advantageous features of a device 24 using a source of infrared radiation 28 and a detector of the radiation 32 for analyzing oil and water flow production in a wellbore casing 12 to determine the source (i.e., the section or location along the casing) of excessive water flow into the wellbore. Use of this device 24 as a production logging device provides significant information which by itself, or in combination with other information from other types of logging tools, gives the well operator details of flow quantities, flow quality, and flow patterns along the wellbore. For example, with this information, the operator may be better able to determine where to selectively seal perforations along a section of the wellbore casing, as with a cement squeeze, to decrease water influx and thereby increase oil production. Selectively sealing the wellbore casing at sections having excessive water production increases the oil production and maintains the pressurization in the formation. This procedure can greatly facilitate successful secondary recovery techniques, such as water or steam injection, by which oil or other desirable hydrocarbons are washed from an underground formation or reservoir.

Figure 1:
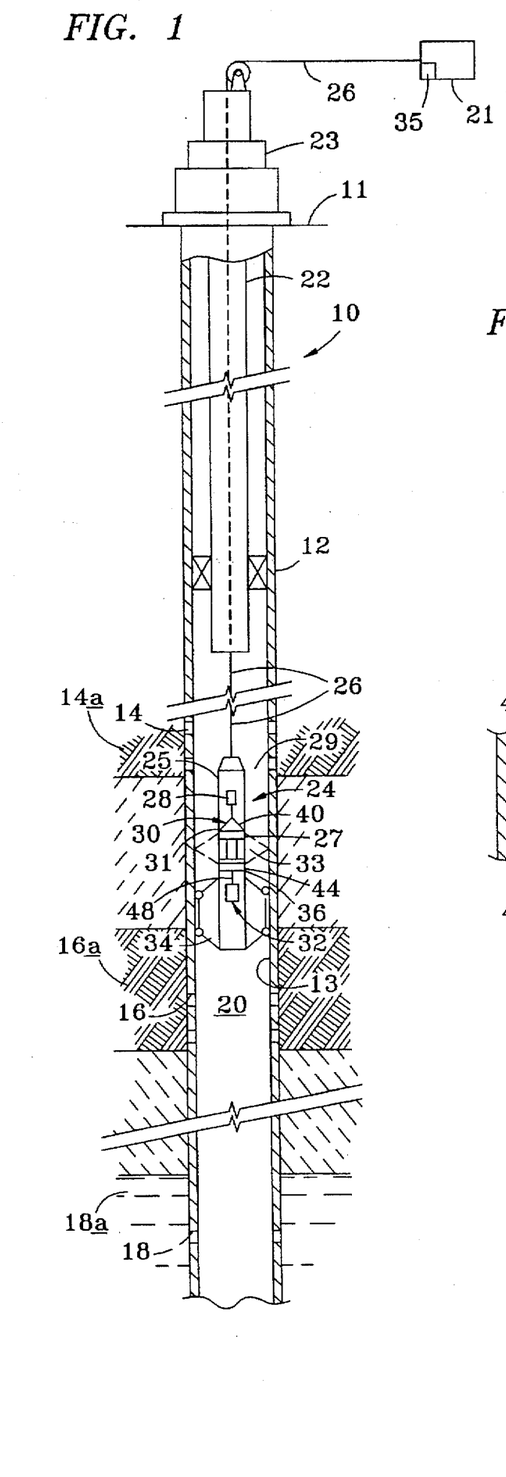
FIG. 1 is a schematic partial cutaway cross-sectional view of a wellbore, including a wellbore casing with a side view of a downhole infrared radiation and detection device inserted therein, according to one embodiment of the invention.

FIG. 1 shows a well 10 having a conventional perforated casing 12 which, by way of example, is shown perforated at sections 14, 16 and 18 of the casing into corresponding selected geological formation or production zones 14a, 16a and 18a, as indicated. It is not uncommon for one well to be drilled so that it accesses more than one reservoir, geological formation or production zone so that recovery may be obtained from all of the zones with the same wellbore. One or more of these production zones may be producing excessive quantities of water into the wellbore 20. As all of the oil and water recovered into the wellbore is for production to the surface, as through a production tubing string 22, excessive quantities of water relative to the quantity of oil production in the wellbore slows production of oil, is costly because the water which is heavier than oil to begin with must be pumped to the surface, and thereby wastes time, energy and the cost of that time and energy. In FIG. 1, an infrared detection device 24 is shown adapted to be placed in the wellbore, as through the tubing string 22 and a conventional wellhead 23 by way of a cable 26. For example, one may use a conventional seven-conductor electric logging wireline or "E" line 26, or another cable capable of both positioning the detection device in the wellbore and also for carrying signals from the device to a remote location 21, such as to a processor site 21, above ground 11.

The infrared radiation is emitted by lamp or source 28 into a transmitter 30 by which the radiation is carried from the source 28 and further transmitted into the flowing production fluid. Preferably, a transmitter 30 is made up of a plurality of individual transmitter elements 40 which carry the infrared radiation and transmit it into discrete detection zones 33 located about the tool body 25 of the logging device 24. The detection zones 33 are, preferably, radially-spaced zones 33 in the annulus 29 of production fluid flow which is formed between the tool body 25 and the inner wall of wellbore casing 13. In a preferred embodiment, the infrared transmitter 30 comprises a plurality of optical fiber elements 40 which are arranged in a conical-shaped array 31, and which array of optical fiber elements 40 terminate at the apex of the conical-shaped array in a fiber bundle which receives the infrared radiation from source 28. The opposite ends of optical fiber transmitters 40 also preferably terminate forming a base of the conical-shaped array 31 around a first portion 27 of the cylindrical-shaped tool body 25. Preferably, the infrared radiation is transmitted at an angle by each of the transmitter elements 40 to form a conical beam path 42 from the base of cone 31 through a window 43 and into the flowing production fluid. Windows 43 may be made of sapphire crystal to provide good transmission of infrared radiation while providing good strength against temperature and pressure. Each individual transmitter 40, preferably, transmits radiation into a separate detection zone 33. In this embodiment, the transmitted infrared radiation is preferably reflected off of the casing inner wall 13 for detection by a suitable infrared detector 32 carried onboard the tool body of the device 24 at a second portion 36 of the tool body. Preferably, the infrared detector 32 is made up of a plurality of individual detection elements, such as optical fiber elements 46, one each for each individual transmitter element 40. The device 24 preferably also includes suitable centralizer members 34 for centralizing the device in the wellbore casing 13. A position indicator 35 is provided, preferably as an above ground cable odometer 35, as shown, for measuring the length of cable 26 extending into the well. Alternatively, an onboard odometer (not shown) or other suitable distance measuring device might be provided to coordinate data to the tool location in the wellbore. The diameter of tool body 25 is preferably substantially less than that of casing 13 so that substantially uniform, uninterrupted flow of wellbore production fluid may continuously pass by the device 24 in annulus 29. Thus, fluid production to the surface 11 is maintained without interruption during the analysis or the logging performed with this inventive device 24.

Figure 2:
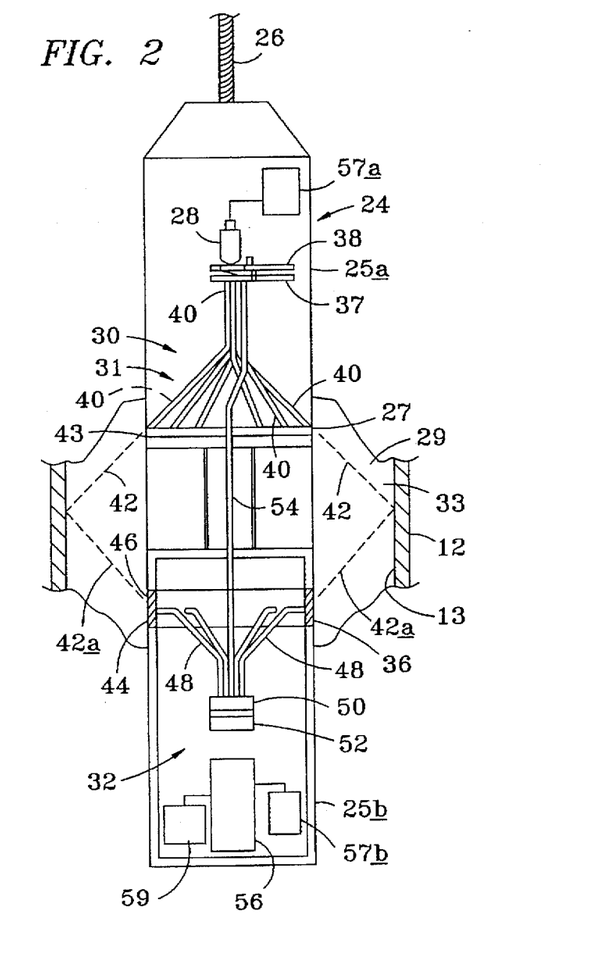
FIG. 2 is an enlarged schematic partial cutaway side view of a downhole infrared radiation and detection device, as in FIG. 1, according to one embodiment of the invention.

FIG. 2 shows further details of the infrared detection device 24, as described with respect to FIG. 1. The infrared source 28 may be a suitable infrared lamp for producing a desired range of infrared or near infrared frequency radiation, which lamp is disposed next to a rotary chopper member 38. In this preferred embodiment, the rotary chopper member 38 may have one or more opened and closed areas disposed for rotation between the lamp or the infrared source 28 and the apex end of the conical-shaped optical fiber array 31. The rotary chopper member 38 can be used to alternately interrupt and then permit transmission of radiation and thereby provide timed pulses of infrared radiation from the lamp 28 to the transmitter 30 and into the plurality of infrared transmitter elements 40. The timed pulses are preferably coupled to the position indicator 35 to facilitate logging of conditions at known longitudinal positions along the wellbore. Preferably, the individual optical fiber elements 40 are bundled together at the apex of the conical-shaped array 31 so that each of the fiber elements receives emissions of substantially the same duration, intensity and frequency of the infrared radiation from the lamp 28. A portion of the received infrared radiation is transmitted along each separate optical fiber element 40. In one preferred embodiment, the optical fibers define a cone shape or a truncated cone shape, at least around first portion 27 of the tool body 25. The fiber elements transmit the infrared radiation through sapphire windows 43 and into the flowing fluid in the annulus 29 between the wellbore 13 and the detection device 24. A conical beam path 42 is formed by the transmitted radiation which is directed toward the wellbore casing inner wall 13. Thus, angled and transmitted infrared radiation is reflected from the inner wall of wellbore 13 so that a complementary conical reflection beam path 42a is formed, which reflection beam is thereby directed to a suitable circumferential reception site 44. Preferably, the circumferential reception site 44 is formed of a plurality of circumferentially adjacent windows 46, which windows 46 receive the reflected radiation which has been transmitted through the flowing production fluid. As with transmission windows 43, the receptor windows may be advantageously formed of sapphire crystal to provide good infrared transmission and good strength at downhole temperature, pressure and chemical conditions. Preferably, at each window 46, the transmitted infrared radiation is collected, as by second optical fiber elements 48 or equivalent structure. Individual optical fiber elements 48 are preferably arranged in radial spaced apart locations about the circumference of the tool body 25 at a second portion 36 thereof. Preferably, each second fiber element 48 corresponds to a first fiber element 40 and is positioned at a corresponding window element 46 which, in turn, corresponds to a location of the separate corresponding transmitters 40. Windows 46 are at a second portion 36 of the tool body 25, which portion is spaced apart from the first portion 27 where the transmitter sites 40 are located. With this spaced apart positioning of the transmitters and receptors, the infrared radiation is received only after transmission through a quantity of wellbore fluid. The received signals are carried to radiation detector 52 which is operatively coupled to the receptors. Preferably, the radiation is also passed through a suitable filter 50 and then to the radiation detector 52. The filter 50 is appropriate for facilitating the desired spectrum analysis. A reference optical fiber transmission member 54 is also preferably interconnected between the radiation source 28 and the filter 50 for reception at detector 52, as schematically depicted in FIG. 2.

In one embodiment operation, an "average" signal from all of the discrete detection zones 33 can be used to indicate the gross fractions of oil and water in the production fluid in the wellbore across the particular section where the measurement is taken. Because, according to this invention, this average signal is derived from a plurality of discrete detection zones, it will be more accurate than the measurement from a single discrete measurement or a single sample. This is true in the wide variety of production flow regimes whether stratified flow, distributed flow or intermittent flow. Accurate information about the average quality or the average constituent content at a particular cross-sectional area of the wellbore is useful in logging procedures. This accurate information cannot always be obtained with only a single discrete measurement or with a production fluid sample taken from a particular section of the wellbore. For example, accuracy is particularly increased where the flow is not uniform or stratified, as where distributed flow such as bubbles of oil in the water or of water in the oil, or as where there is intermittent flow such as plugs or slugs of oil or of water, a plurality of measurements can give a more accurate average than a single sample. The inventive device can provide substantially continuous averages along the length of the wellbore without requiring extended periods of time to obtain a plurality of separate testing samples. With this device, the linear resolution of these average measurements is increased over previous testing devices or methods.

Also advantageously for another mode of operation, a suitable shutter 37, such as a rotary disk with one or more predetermined size openings therein, may be provided to selectively cause transmission of infrared radiation from the source 28 into one or more selected detection zones 33 so that transmitted infrared radiation through such separate detection zones is received at detector 52. Thus, for example, the shutter 37 may permit radiation from source 28 into a single transmitter element 40 for transmission into and through a single detection zone 33, and for reception at a reception window and transmission through a second receptor element 48 through filter 50 to detector 52, and ultimately it is analyzed at analyzer 56. Similar measurements can be taken for each of the plurality of discrete detection zones 33 using shutter 37 to separately provide pulses of radiation to the separate transmitter elements 40. With this mechanism a single uniform infrared radiation source 28 and a single sophisticated radiation detector 52 may be used with a plurality of relatively less expensive transmitter and receiver fiber optic elements to produce a high resolution infrared detection tool.

In the arrangement indicated in FIG. 2, the infrared radiation source 28 and the transmission elements 40 and the receiver elements 48 are stationary with respect to the housing elements 25a and 25b of the device 24. Thus, over a predetermined measurement time, an average signal is processed and analyzed by a suitable analyzer circuit 56 operatively connected to the detector 52. The analyzer 56 may be at a remote location 21 and operatively coupled through a cable 26 to receive signals from detector 52. In the preferred embodiment as shown in FIG. 2, analyzer 56 is carried onboard and produces a signal representing a spectrum analysis or other spectrum data. Transmission of this spectrum data signal from analyzer 56 may be carried to a remote location 21 from the downhole device to the surface through the "E" line 26 or other suitable conductor cable useful for traversing the device through the wellbore. The transmitter windows 43 and the receptor windows 46 are typically formed of materials which have good transmissivity of infrared radiation in the expected frequency or wave length range. Sapphire crystal, for example, is particularly useful for "windows" for transmitting infrared radiation.

Figures 3, 4, 5:
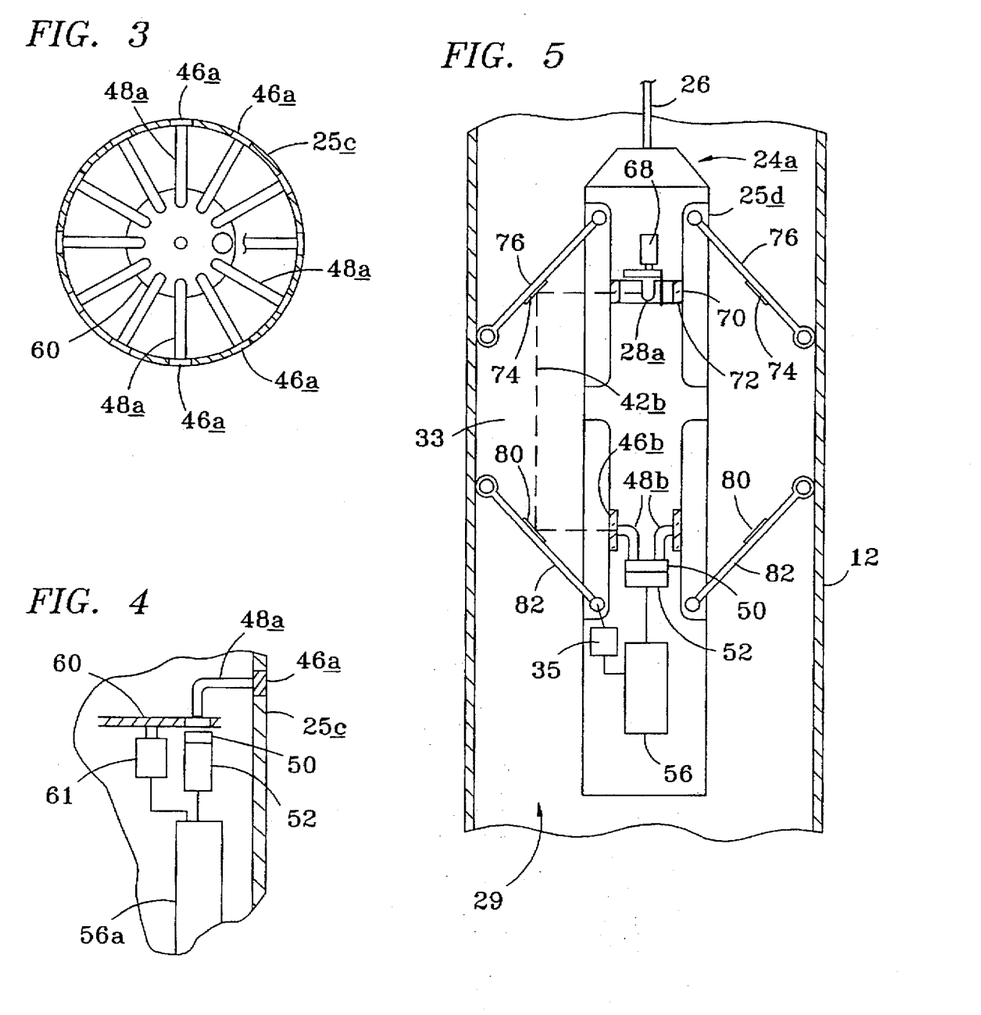
FIG. 3 is a top cutaway view of a downhole infrared radiation detector for the device of FIGS. 1 and 2, according to another embodiment of the invention.
FIG. 4 is a partial cutaway side view of the infrared radiation detector of FIG. 3.
FIG. 5 is a schematic partial cutaway side view of a downhole infrared radiation and detection device, according to another embodiment of the invention.

As mentioned previously, it may be particularly desirable to detect water flow within the wellbore at numerous radial locations about the longitudinal wellbore axis. FIGS. 3 and 4 show a modification of the detector side of the infrared detection device 24. FIG. 3 is a transverse section view through a modified housing 25c wherein an array of sapphire windows 46a, twelve shown, are evenly spaced radially, about the modified housing 25c, at 30° intervals about the central longitudinal axis of the device (and the wellbore). Each window 46a is connected to an optical fiber element 48a for transmitting the infrared signal which has passed through the wellbore fluid in the immediate vicinity of the respective windows for transmission through filter 50 and to a detector 52. Preferably, each of the optical fiber elements or bundles 48a allows signal transmission to the detector 52 of only one signal from one optical fiber bundle at a time. Shutter 60 is driven by stepping motor 61 and an analyzer circuit 56a may correlate the position of shutter 37 with the signal detected by the filter detector 50, 52 to identify the circumferential position wherein a particular fluid, such as a high concentration of water, is being sensed.

Reflection of the infrared signal from the casing wall may be inadequate in certain instances, such as with corroded or contaminated casing. FIG. 5 shows an embodiment of the logging device 24a wherein an infrared source 28a is rotated by a suitable motor 68 so that it transmits an infrared signal through a circumferential window 70 formed in housing 25d. In a preferred embodiment, lamp 28a does not rotate but the radiation is effectively "rotated" by allowing it to transmit through an opening in a rotating reflector shade 72. Preferably, the reflector shade member 72 is mounted for rotation with or around the source 28a to direct the infrared beam radially outward toward reflectors (mirrors) 74 mounted on circumferentially spaced retractable support arms 76. The support arms 76 may also serve as centralizer arms for the device 24a. A suitable number (three, four, six or more) of arms 76 may be circumferentially spaced for deployment to the working position shown on the housing 25d. Any suitable mechanism may be used for extending and retracting the arms 76 and is not shown in the interest of clarity. Each support arm 76 may hold one reflector 74 (or more than one to increase the number of detection zones) in proper alignment with transmitter window 70 for receiving transmitted infrared radiation. The reflectors 74 direct the infrared radiation in a path through the production fluid in the annulus 29 back to receptor windows 44b on the tool body. The received radiation is carried by receptor elements 46b through a filter 50 to detector 52 and analyzer 56.

In the preferred embodiment as shown in FIG. 5, a second set of axially spaced reflectors 80 is aligned with each of the first reflectors 74. Preferably, the reflectors 80 are also mounted on retractable and extensible support arms 82 similar to the arms 76, as shown. Any suitable mechanism may be used for extending and retracting the arms 82 outward into the annuls between the tool body and the wellbore casing. The infrared radiation beam 42b is transmitted to reflectors 74 through individual production fluid flow zones to reflectors 80 and back to the housing 25d where the transmitted radiation is received through a suitable circumferential window 46b which may be made of individual sapphire windows 46b either adjacent to one another or at regular spaced-apart intervals. Such sapphire windows permit transmission or reception of infrared radiation through optical fiber elements 48b to the filter 50 and to detector 52 which provides a signal to the analyzer circuit 56. The analyzer circuit 56 produces a signal representing the infrared spectrum information for the radiation received at the detector 52. A reference channel, such as an uninterrupted fiber optic bundle 54, is preferably provided to facilitate spectrum analysis, but it is omitted from the illustrations of FIGS. 3–5 in the interest of clarity.

Figure 6:
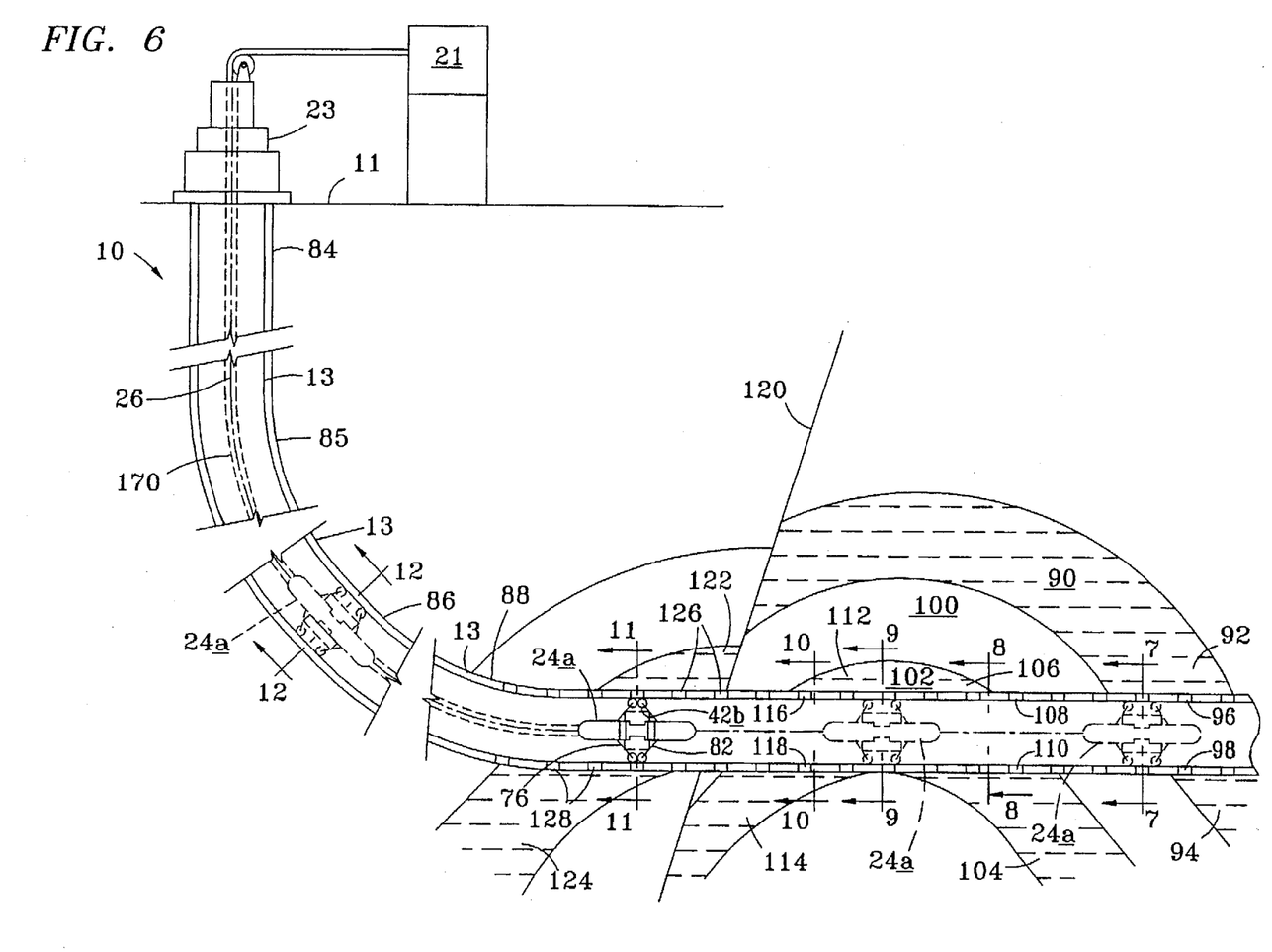
FIG. 6 is a schematic cutaway side view of a kickoff wellbore, including horizontal wellbore casing with perforations along a schematic representation of a plurality of secondary recovery underground formations with a downhole infrared radiation and detection device shown at various alternate positions therealong.

FIG. 6 is a schematic depiction of a kickoff wellbore with a substantially vertical portion 84, curved or inclined portions 85 and 86, and a substantially horizontal portion 88, extending into a schematically depicted geological formation with multiple oil or other hydrocarbon producing strata or sections, various ones of which may or may not be subject to secondary or tertiary recovery procedures such as steam, water or miscible injectant injection. It will be understood by those skilled in the art that the length of the inclined or curved sections 85 and 86 may be several hundreds or even thousands of feet and the horizontal section 88 may also extend thousands of feet from the vertical shaft 84. These types of wells are particularly prevalent for purposes of reducing the surface disruption while tapping numerous underground reserves in a particular geographical area. In FIG. 6, the inventive logging tool 24 may be constructed according to the preferred embodiment of FIGS. 1 and 2 (not shown in FIG. 6) or may be constructed according to the preferred embodiment 24a (shown in FIG. 6), as in FIGS. 3–5 and as discussed above. The logging tool 24a is schematically depicted in phantom lines at various alternative positions along the wellbore, it being understood that in a typical logging procedure a single device 24 with or without other types of logging tools (such as pressure, temperature and flow rate tools) would be traversed along the entire length of the wellbore with a coiled tubing 170 and "E" line 26 combination to produce a log of infrared detection information from which flow patterns or flow regimes could be usefully determined.

By way of example, one method of deploying a logging tool in a horizontal well is with a combination of coiled tubing and "E" line. The "E" line is pumped through a spool of coiled tubing. The tool is attached to the end of the coiled tubing and connected to the "E" line. The tool is then moved in the horizontal section of the well with the coiled tubing. Another method is to make the tool self-contained with onboard power supply, such as batteries 57a and 57b, and onboard computer storage 59 of log data. A coiled tubing can then be used to move the logging tool in the wellbore without an "E" line. The data can be recovered or down loaded from the computer storage when the tool is retrieved to the surface. Other methods and mechanisms for moving the tool and communicating the data for logging purposes may be used without departing from other aspects of the invention.

In the example depicted in FIG. 6, various geographic strata or formations are shown, including a production formation 90 which is schematically depicted with a saturation of water both in a portion 92 of formation 90 above the casing and in a portion 94 of formation 90 below the casing. In this hypothetical situation, water may be received into the flowing production fluid of the wellbore casing 13 from perforations 96 at the top of the pipe, as well as from perforations 98 at the bottom of the pipe. One or more nonproducing strata 100 or formations 100 are shown interposed between formation 90 and producing formation 102. For discussion purposes, formation 102 is depicted as a dome formation which might be subject to secondary recovery with the injection of water propagating from a lower region 104 below the wellbore casing with primarily recoverable hydrocarbon or oil in portions 106 and 112 of formation 102 above the wellbore. Oil may also be present in an adjacent portion 114 of formation 102 for recovery at another section of the wellbore. In this hypothetical situation, water might enter the casing partially through perforations 110 with oil entering the casing through upper perforations 116, and also from lower perforations 118. The water pressure from portion 104 of the formation 102 could advantageously assist in the production of oil in other portions 106, 112 and 114 of the same formation 102. Thus, it would be advantageous to discover whether water is entering through perforations 110 and 108. If water is entering the wellbore at perforations 110 and 108, those perforations could then be sealed, using any method of sealing, for example a cement squeeze, to facilitate oil recovery or production through the perforations 116 and 118. Another hypothetical formation is depicted along a fault line 120 with an oil producing strata 122 which may have recoverable hydrocarbon, both in the upper portion 126 and also in the lower portion 124. Another hypothetical situation is shown at an inclined section 86 where a logging device 24a could provide useful information.

Figures 7, 8:
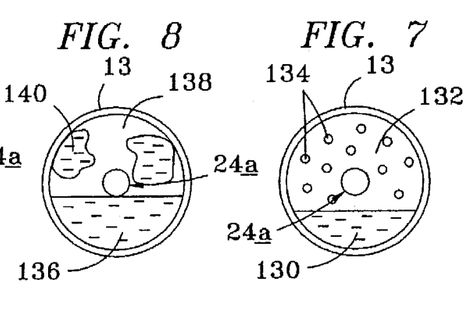
FIG. 7 is a hypothetical schematic flow pattern cross section of the horizontal wellbore and recovery casing of FIG. 6 taken along section line 7—7 showing a fluid flow regime having a water and oil flow pattern with water bubbles propagating through the oil, sometimes referred to as distributed water bubbles.
FIG. 8 is a hypothetical schematic flow pattern cross section of the horizontal wellbore and recovery casing of FIG. 6 taken along section line 8—8 showing a fluid flow regime having a water and oil flow pattern with intermittent plugs of water in the oil.
Figure 13:
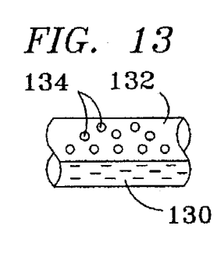
FIG. 13 is schematic side view representing the hypothetical flow pattern or flow regime of FIG. 7.

Turning now to FIGS. 7 and 13 which schematically depict a cross section of a hypothetical oil flow pattern at cross section 7—7 of the wellbore of FIG. 6 and a corresponding side view in FIG. 13. For this example, water, which is the heavier of the liquids, is in a layer along the bottom and oil is moving along the upper portion of the horizontal wellbore. If formation 90 is producing water at a water bearing portion 92 of formation 90, water bubbles 134 might be distributed through the moving matrix of oil 132 as the bubbles of water migrate down into water layer 130. It will be observed that a single sample of the fluid within the casing 13 at section 7—7 would provide a different infrared transmission spectrum or infrared absorption spectrum, depending on whether the sample was taken in the water layer 130, in the oil matrix 132, at a water bubble 134, or at a position where there is a combination of more than one of those conditions. In this situation, a detection device, according to the invention, having discrete sampling zones entirely around the annular flow pattern, can provide an infrared spectrum analysis which can usefully identify each flow condition and can detect where each condition exists in the wellbore. An accurate three-dimensional "picture" of the flow regime can be obtained by continuously moving the detector device through the wellbore and recording the infrared spectrum measurements across the cross section of the wellbore.

Figure 14:
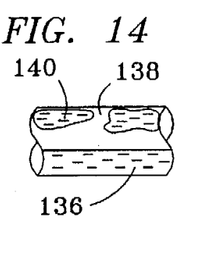
FIG. 14 is a schematic side view of the hypothetical flow pattern or flow regime of FIG. 8.

FIG. 8 depicts another hypothetical flow pattern or flow regime at cross section 8—8 of FIG. 6. FIG. 14 shows the side view corresponding to the flow pattern schematically depicted in FIG. 8. An intermittent plug flow is depicted in which there is a water layer 136, an oil matrix 138, and plugs 140 of water. Detection on a substantially continuous basis at a plurality of detection zones around the wellbore may show areas of oil and water interrupted by areas of water only. This log of the wellbore flow could be consistent with an intermittent slug flow regime.

Figure 9:
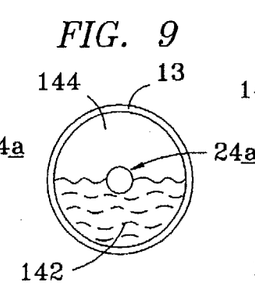
FIG. 9 is a hypothetical schematic flow pattern cross section of the horizontal wellbore and recovery casing of FIG. 6 taken along section line 9—9 showing a fluid flow regime having a water and oil flow pattern with the percentage of oil increased from the amount shown in FIG. 8 and depicting segregated wavy flow.
Figure 15:
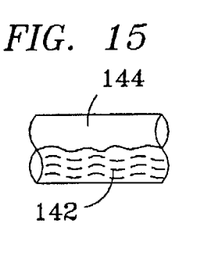
FIG. 15 is a schematic side view of the hypothetical flow pattern or flow regime of FIG. 9.

FIG. 9 is another hypothetical schematic flow pattern at cross section 9—9 of the wellbore of FIG. 6. FIG. 15 is a side view of the same flow pattern or flow regime. In this depiction, wavy flow is shown which might hypothetically result from the water plugs 140 of FIG. 8 coalescing into the water layer 142; however, with remaining turbulence so that wavy water and oil flow is produced. This type of segregated wavy flow may also result at joints or bumps in the side walls of the casing 13. An infrared detection device and method which has a plurality of radially-spaced detection zones would be able to beneficially determine this condition, based upon the infrared transmission or infrared absorption characteristics of water compared to oil.

Figures 10, 11:
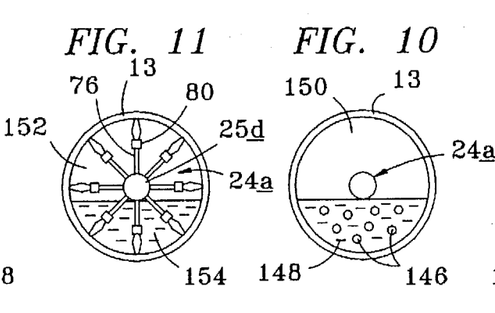
FIG. 10 is a hypothetical schematic flow pattern cross section of the horizontal wellbore and recovery casing of FIG. 6 taken along section line 10—10 showing a fluid flow regime having a water and oil flow pattern with oil bubbles propagating through the water, sometimes referred to as distributed oil.
FIG. 11 is a hypothetical schematic flow pattern cross section of the horizontal wellbore and recovery casing of FIG. 6 taken along section line 11—11 showing a segregated stratified water and oil flow pattern with approximately equal amounts of oil and water.
Figure 16:
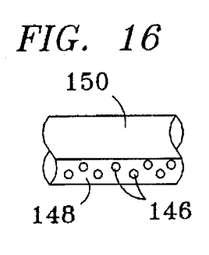
FIG. 16 is a schematic side view of the hypothetical flow pattern or flow regime of FIG. 10.

FIG. 10 is a hypothetical flow pattern taken at section 10—10 of FIG. 6 in which one fluid is distributed as bubbles in another fluid. FIG. 16 shows a side view of the same flow pattern. In this example, oil bubbles 146 are distributed in water layer 148. This condition might indicate that oil is being introduced into the water layer 148 from formation 114 and through perforations 118. The oil bubbles 146 could be indicative of oil recovery from formation 114. The bubbles 148 would tend to migrate to an upper oil layer 150. The infrared transmission or absorption characteristics of a water layer 148 with distributed oil bubbles 146 may be detected with the infrared detector and also the volume of the oil 150 will be determinable, based upon analysis of the plurality of discrete detection zones. For example, if seven out of twelve detection zones show oil, the volume of oil could be over fifty percent (50%) (i.e., 7/12=0.58333).

Figure 17:
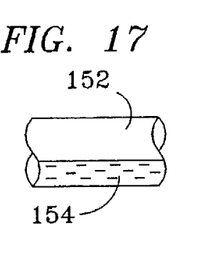
FIG. 17 is a schematic side view of the hypothetical flow pattern or flow regime of FIG. 11.

FIG. 11 is a cross section along section line 11—11 of FIG. 6 depicting a hypothetical segregated flow regime which is stratified into an oil layer 152 and a water layer 154. FIG. 17 is a schematic side view corresponding to the hypothetical flow pattern depicted in FIG. 11. This flow pattern or flow regime and the quantity of each component could be detected and logged with the inventive device and method.

Figure 12:
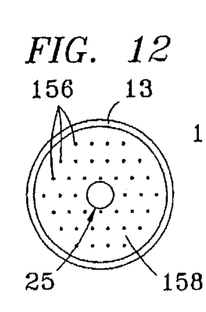
FIG. 12 is a hypothetical schematic flow pattern cross section of the horizontal wellbore and recovery casing of FIG. 6 taken along section line 12—12 showing a flow pattern in which the oil is present in a distributed mist flow regime at an inclined portion of the kickoff well of FIG. 6.
Figure 18:
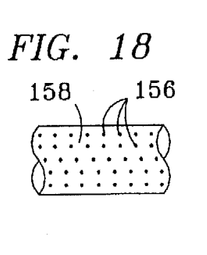
FIG. 18 is a schematic side view of the hypothetical flow pattern or flow regime of FIG. 12.

FIG. 12 depicts a cross sectional flow pattern hypothetically taken at section 12—12 of an incline wellbore 86. FIG. 18 further schematically depicts a side view of the distributed mist flow regime in which, due to particular characteristics of the well and flow production, a mist of one component finely distributed in the other components will produce a characteristic infrared transmission and/or infrared absorption spectrum which can be determined using Applicant's inventive logging tool.

Figure 19:
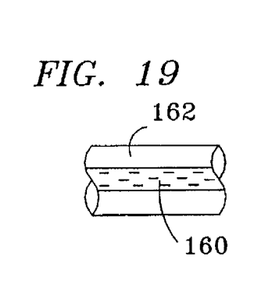
FIG. 19 is a hypothetical side view of a flow regime pattern, sometimes known as a stratified annular flow pattern.

FIG. 19 is a side view of a schematic hypothetical stratified annular flow pattern.

Figure 20:
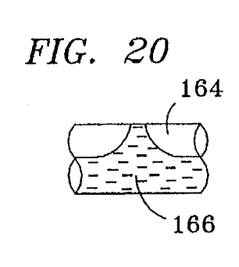
FIG. 20 is a side view of a hypothetical schematic flow regime, sometimes referred to as slug flow.

FIG. 20 shows another potential flow regime referred to as an intermittent slug flow with slugs of one component being interposed among the other components. In this particular example, slugs of oil 164 are carried in waves of water 166. With a sufficient number of discrete detection zones using the infrared detection device as disclosed, this situation could, for example, be distinguished from intermittent plug flows as depicted in FIGS. 8 and 14.

According to the method of use of Applicant's invention, the detection of infrared radiation transmission characteristics or infrared radiation absorption characteristics in a plurality of discrete detection zones can be analyzed either to produce an average analysis from which the flow quality or the quantities of each constituent part can be determined. Alternatively, information from the plurality of discrete detection zones can be analyzed to determine from the infrared transmission or absorption characteristics of the various zones what the flow regime or the flow pattern is for that particular section at which the measurements are taken. By logging the measurements for a length of wellbore and By plotting this information in a continuous log, the user may determine, for example, areas or sections of wellbore in which water production is excessive without significant oil production. Sections with excessive water production may be sealed as with a cement squeeze process so that oil production in the wellbore is maximized.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A production logging device insertable into a wellbore casing for determining concentration of specified components in flowing production fluid comprising:
   a. a tool body sized smaller in diameter than said wellbore casing so that said flowing fluid production is not blocked;
   b. a line connected to said tool body by which movement of said body within said wellbore casing can be selectably controlled from a remote location and by which information signals can be communicated from said tool body to said remote location;
   c. an infrared radiation source operatively connected to said tool body;
   d. a plurality of infrared transmission sites circumferentially spaced around said tool body directed so that infrared radiation from said infrared radiation source is transmitted through said flowing production fluid;
   e. a plurality of infrared reception sites circumferentially spaced around said tool body positioned so that said infrared radiation transmitted through said flowing production fluid is received at said plurality of reception sites; and
   f. an infrared analyzer carried by said tool body operatively connected to said infrared reception sites so that the spectrum of infrared radiation transmitted through said production fluid can be determined.

2. The production logging device of claim 1 wherein:
   a. said plurality of infrared transmission sites comprise an array of infrared transmitters, each transmitting a portion of said infrared radiation from said source and into said fluid flowing in said wellbore and each transmitter directing said infrared radiation at a predetermined radial position around said tool body; and
   b. said plurality of reception sites correspond in radial position and spaced a predetermined distance from said transmission sites, each for reception of transmitted infrared radiation having passed through a portion of said fluid flowing in said wellbore in said space between each said transmitter and each said reception site.

3. The production logging device of claim 2 wherein:
   a. said array of infrared transmitters comprise an arrangement of infrared radiation transmitting fibers defining a conical shape, each fiber exposed to said infrared radiation source at an apex of said conical shape and each fiber extending at an angle from said apex radially spaced from each other fiber around said sides of said conical shape and each fiber separately carrying said infrared radiation from said source and directing said infrared radiation into said fluid flowing in said wellbore casing so that it is transmitted through said flowing fluid and is reflected at a complementary angle from said casing and back toward said tool body; and
   b. said plurality of reception sites positioned around said tool body to receive said infrared radiation transmitted through said flowing fluid and reflected from said wellbore casing.

4. The production logging device as in claim 1 further comprising:
   a. a plurality of first centering arms connected to said tool body at predetermined evenly-spaced positions circumferentially therearound and evenly biased outwardly for contact with said well casing so that said tool body is held centered in said wellbore casing as it is moved therethrough, each first centering arm carrying a first angled reflector, each first reflector directing infrared radiation transmitted from one of said plurality of infrared transmission sites in a direction toward said reception sites; and
   b. a plurality of second centering arms connected to said tool body at predetermined evenly-spaced positions circumferentially therearound and evenly biased outwardly in contact with said well casing so that said tool body is held centered in said wellbore casing as it is moved therethrough, each second centering arm carrying a second angled reflector positioned for receiving said transmitted infrared radiation from one of said first reflectors and for reflecting said infrared radiation to one of said reception sites.

5. The production logging device of claim 1 further comprising:
   a. a chopper mechanism between said infrared source and said transmission sites to provide a pulse of infrared radiation in each of said transmission sites for a predetermined period of time;
   b. said analyzer operatively connected to said infrared reception sites to detect the spectrum of infrared radiation transmitted through said flowing fluid from all of said reception sites and adapted to provide a spectrum determination of the average content of said wellbore during said predetermined period of time; and
   c. a tool body position indicator operatively coupled to said chopper mechanism and said analyzer by which the position of said tool body can be correlated to said spectrum determination of the average water and oil content of said wellbore taken during said predetermined period of time.

6. The production logging device of claim 5 further comprising a selection device operatively interposed between said chopper mechanism and said analyzer for alternatingly permitting or interrupting infrared radiation transmission to a selected one of said plurality of infrared transmission sites, and wherein said analyzer is adapted to provide a spectrum determination of the radiation transmitted through said flowing fluid from said selected one of said plurality of transmission sites.

7. The production logging device of claim 1 further comprising a transmission shutter mechanism operatively interposed in said tool body between said infrared radiation source and said plurality of infrared transmission sites for selectively permitting and interrupting infrared transmission from said radiation source to individual ones of said plurality of said infrared transmission sites.

8. The production logging device of claim 1 further comprising a reception shutter operatively carded in said tool body positioned between said plurality of infrared reception sites and said infrared analyzer for alternatingly permitting and interrupting infrared radiation transmission from selected ones of said plurality of infrared reception sites to said infrared analyzer.

9. The production logging device of claim 1 further comprising a direct infrared transmission line from said source to said analyzer, without transmission through said flowing fluid, and by which said analyzer can compare the infrared radiation spectrum of said source to infrared radiation spectrum transmitted through said flowing production fluid and received at said reception sites.

10. The production logging device of claim 1 wherein said tool body is operatively coupled for insertion into a wellbore casing to one or more downhole measuring devices selected from a flow meter, a pressure gauge, a temperature gauge or a capacitance detector.

11. The production logging device of claim 1 wherein said infrared radiation source and said infrared analyzer are carried by said tool body.

12. An infrared radiation and detection device for determining infrared absorption and transmission characteristics of flowing production fluid in a wellbore casing comprising:
   a. a cylindrical body having a longitudinal axis and a cylindrical diameter smaller than said wellbore casing;
   b. a signal communicating cable connecting said cylindrical body to the surface;
   c. a centralizer mechanism to keep said cylindrical body centered in said wellbore casing to allow uninterrupted production fluid flow in an annulus formed therearound;
   d. a plurality of infrared transmitters spaced radially at positions around a circumference of said cylindrical body at a predetermined longitudinal location for transmitting infrared radiation at said separate radial positions into said flowing production fluid in said annulus between said centralized body and said wellbore casing;
   e. a plurality of infrared receptors at positions radially corresponding to said positions of said infrared transmitters and spaced longitudinally apart from said infrared transmitters for receiving infrared radiation directed into said flowing fluid and transmitted a predetermined distance through said flowing fluid; and
   f. an infrared spectrum analyzer by which the infrared radiation transmitted through said flowing fluid between said transmitters and said receptors can be analyzed to determine information about infrared absorption and transmission characteristics of said flowing fluid at each of said radially-spaced infrared transmitter and receptor positions.

13. An infrared radiation and detection device as in claim 12 further comprising a controllable selection mechanism operatively coupled to said infrared transmitters and receptors for selectively permitting and interrupting selected ones of said plurality of infrared transmitters and receptors so that information determined by said analyzer about infrared absorption and transmission characteristics corresponds to a selected position in said fluid flow corresponding to said selected infrared transmitter and receptor.

14. The infrared radiation and detection device of claim 12 further comprising:
   a. a single infrared radiation source;
   b. a plurality of ends of said infrared transmitters uniformly spaced from said single infrared radiation source for receiving uniform intensity and frequency infrared radiation from said source;
   c. a single infrared spectrum analyzer; and
   d. a plurality of ends of said plurality of infrared receptors uniformly spaced from said infrared spectrum analyzer so that uniform transmission characteristics between said infrared receptors between each of said plurality infrared receptors and said single infrared spectrum analyzer are maintained.

15. The infrared radiation and detection device of claim 12 further comprising a plurality of reception windows sealed around said cylindrical body at positions between said infrared receptors and said flowing production fluid, said windows having good infrared transmission characteristics and sufficient strength to resist pressures and temperatures characteristic of oil production wellbore environments.

16. An infrared radiation and detection device of claim 12 further comprising one or more other logging instruments selected from a group including pressure detector, temperature detector, flow meter and capacitance detector, operatively coupled to said signal communicating cable connecting said cylindrical body and said other downhole logging instruments so that one or more other downhole conditions at said plurality of positions corresponding to said infrared transmitter and receptor positions in said production fluid flow can be coordinated with said information about said infrared absorption and transmission characteristics.

17. An infrared detection logging method comprising the steps of:
   a. transmitting infrared radiation through a plurality of radial zones in production fluid flowing in a wellbore at a known location along the length of said wellbore;
   b. receiving transmitted infrared radiation from said plurality of radial zones of flowing production fluid;
   c. analyzing said received radiation to determine the infrared radiation transmission and absorption characteristics of said production fluid flow at said radial zones;
   d. logging said analyzed information for said plurality of radial zones at said known location along the length of said wellbore; and
   e. determining from said logged infrared spectrum information at least one of the content, quality and flow regime at said location along the length of said wellbore.

18. The infrared detection logging method of claim 17 further comprising:
   a. the step of plotting the results of a multiplicity of measurements along the length of the wellbore; and
   b. analyzing the multiplicity of plotted infrared spectrum analysis results to determine locations along the length of said wellbore which are producing excessive amounts of water.

19. An infrared detection logging method as in claim 18 further comprising the step of improving the wellbore production by sealing sections of said well having excess water production.

20. The infrared detection logging method as in claim 17 further comprising the step of additionally measuring at each location along the length of said wellbore at which said infrared detection measurements are taken, one or more additional measurements selected from the group of pressure measurements, temperature measurements, fluid flow measurements and capacitance measurements.

21. The infrared detection logging method of claim 20 further comprising the step of plotting the results of a plurality of infrared detection spectrum analysis and a plurality of results from said one or more pressure, temperature, flow or capacitance measurements with a multiplicity of similar measurements taken at a multiplicity of separate locations along the length of said wellbore.

* * * * *